United States Patent [19]

Gough

[11] 4,084,446

[45] Apr. 18, 1978

[54] VIBRATORY MACHINE

[75] Inventor: George Terah Gough, Newcastle, England

[73] Assignee: Gough & Company (Hanley) Limited, Stoke on Trent, England

[21] Appl. No.: 695,819

[22] Filed: Jun. 14, 1976

[30] Foreign Application Priority Data

Jun. 17, 1975 United Kingdom ............... 25750/75

[51] Int. Cl.² ............................................ F16H 33/00

[52] U.S. Cl. ........................................................ 74/61

[58] Field of Search ..................................... 74/61, 87

[56] References Cited

U.S. PATENT DOCUMENTS

| | | | |
|---|---|---|---|
| 2,238,116 | 4/1941 | Kelly | 74/61 |
| 3,089,582 | 5/1963 | Musschoot et al. | 74/61 |
| 3,173,300 | 3/1965 | Loveless | 74/61 |
| 3,203,264 | 8/1965 | Evans | 74/61 |
| 3,491,881 | 1/1970 | Winquist | 74/61 |

*Primary Examiner*—Benjamin W. Wyche

*Assistant Examiner*—Wesley S. Ratliff, Jr.

*Attorney, Agent, or Firm*—Diller, Brown, Ramik & Wight

[57] ABSTRACT

A drive mechanism for a vibratory machine, comprising an input shaft rotatably mountable on the non-vibrating frame of the machine and adapted to be driven, e.g. by a belt drive and pulleys from a standard electric motor, an output shaft mounted in line with the input shaft on the vibratable part of the machine by heavy duty bearings and a flexible resiliently deformable member in the form of an inflatable bellows located between the input and output shafts and preferably sandwiched between plates mounted on the ends of the two shafts and out-of-balance weights on the output shaft whereby, upon rotation of the input shaft, the output shaft will be rotated at the same speed and due to the presence of the weights will cause vibration of the vibratable part of the machine, the flexible resiliently deformable member ensuring that little or no motion other than rotation is transmitted from the output shaft to the input shaft and hence to the electric motor.

9 Claims, 1 Drawing Figure

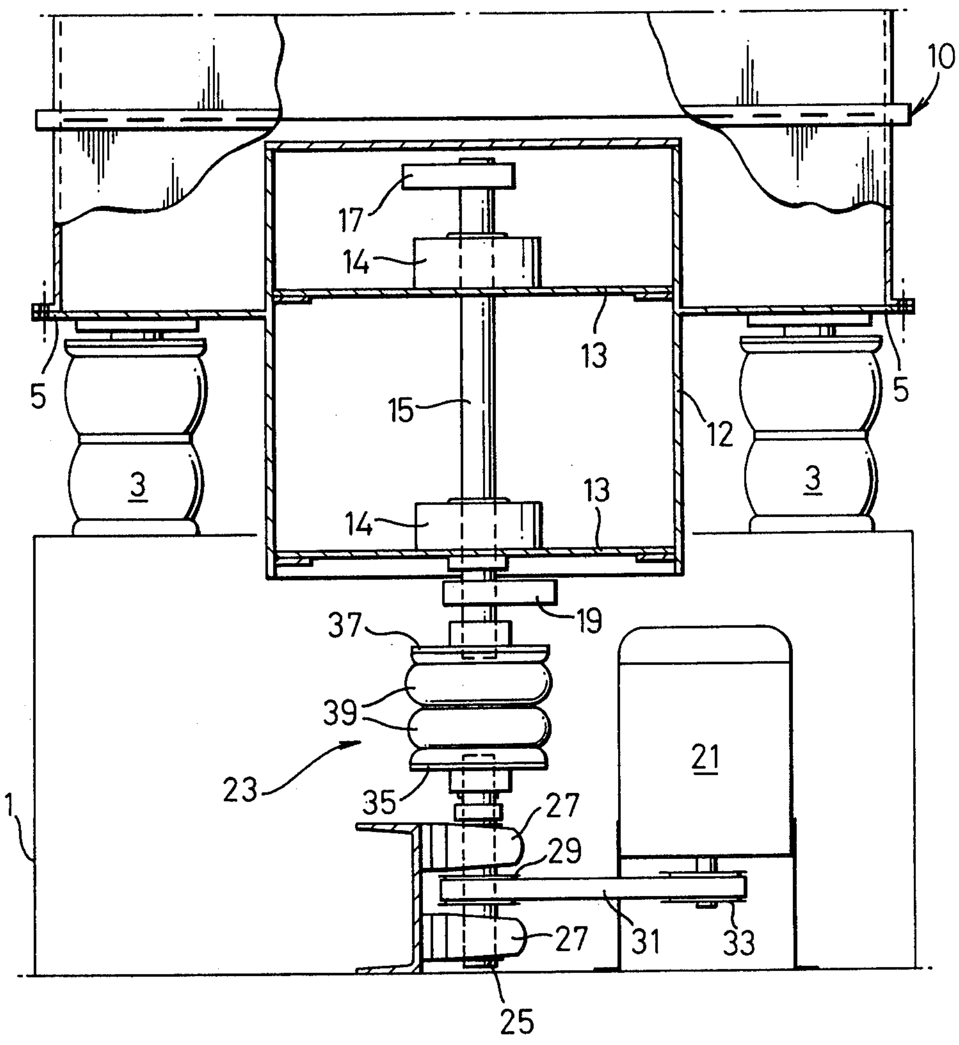
10
17
14
13
5
15
12
5
3
3
13
14
19
37
39
21
23
35
27
1
29
31
33
27
25

VIBRATORY MACHINE

The invention relates to a drive mechanism for vibratory machines.

In particular, the invention is concerned with a drive mechanism for vibratory separating or screening machines or polishing and deburring machines. Such machines are the subject of our co-pending British patent application Nos. 6776/75 and 1,401,631, and the present invention is specially suitable for driving the machines disclosed in those patent specifications.

In all vibratory machines, there is always a problem in transmitting drive from the power source, e.g. an electric motor, to the part of the machine to be vibrated, and traditionally this has been done by connecting the drive shaft of the power source directly to a drive shaft on the part of the machine to be vibrated and either mounting the power source so that it can withstand vibrations or using a special coupling to minimise vibration imparted to the power source. Obviously, if vibration to the power source is to be cut down, the special coupling must be of an expensive nature or alternatively, the power source itself, e.g. an electric motor, must be specially designed to withstand the vibrations. Such motors are very expensive, thus making the whole machine expensive. Also, it has been found that with these known systems, problems still occur either with the power source or the coupling.

We have now designed a drive mechanism which we believe overcomes the problems of known vibratory machines and makes it possible to use standard equipment as the source of power, e.g. an "off the shelf" electric motor, thus reducing the cost of the machine, or a standard air or hydraulic motor.

According to the broadest aspect of the present invention, we provide a drive mechanism for transferring drive from a power source to the vibrating part of a vibratory machine, comprising an input shaft terminating in a driving end, an output shaft having a driven end and a flexible resiliently deformable member connected between said two ends and capable of imparting rotary motion of the input shaft to the output shaft without transmitting other motions of the output shaft to the input shaft, the output shaft being adapted for connection to the vibratory part of the machine through suitable bearings and arranged adjustably to receive at least one out-of-balance weight, and the input shaft being adapted for mounting on a nonvibrating frame of the vibratory machine and adapted to be rotated by the power source.

More specifically, the present invention provides a vibratory machine comprising a support frame, one or more flexible suspension devices supported on said support frame, a vibratable member supported by said one or more suspension devices and at least one out-of-balance weight rotatable about the longitudinal axis of an output shaft connected to said vibratable member through one or more suitable bearings, an input shaft rotatably mounted in suitable bearings supported on the support frame for rotation by a power source, the input shaft terminating in a driving end connected to one end of a flexible, resiliently deformable member, the other end of which is connected to the output shaft for imparting rotation of the input shaft to the output shaft without transmitting other motions of the output shaft to the input shaft.

Preferably, a plate-like member is connected to each of said shaft ends, and the flexible resiliently deformable member is connected to and sandwiched between the two plate-like members. Preferably, there are two out-of-balance weights adjustably mounted on the output shaft, one adjacent each end of the shaft, and a belt pulley is mounted on the lower end of the input shaft which extends in line with the output shaft, the belt pulley being connected by a belt to a motor.

The drive mechanism is particularly useful for driving vibratory polishing, or shaking or drying or screening machines. Preferably, therefore, the input and output shafts are mounted for rotation about a common vertical axis and the vibratable member may comprise an annular polishing bowl or a cylindrical bowl with suitable screens therein, the flexible suspension devices being inflatable airbags, and two out-of-balance weights are adjustably mounted on the output shaft, one adjacent each end thereof, and the power source comprises an ordinary, standard motor mounted on the support frame.

Preferably, the flexible resiliently deformable member extending between the two plate-like members is similar in construction to the body of the airbags.

A preferred embodiment of the invention is now described, by way of example, with reference to the accompanying drawing which is a schematic side elevation, partly in section, of a vibratory machine.

Referring to the drawing, the machine includes a heavy support frame including a generally triangular base 1 supporting three equi-angularly arranged flexible suspension devices in the form of inflatable bags 3 which themselves support a base plate 5.

The base plate 5 has a depending cylindrical housing portion 12 extending down through an aperture in the base 1 and has two circular horizontal plates 13 connected to it. These plates are connected by heavy duty bearings 14 to a vertical output shaft 15 having out-of-balance weights 17, 19 adjustably mounted thereon adjacent each end of the shaft. These out-of-balance weights 17,19 can be adjusted on the shaft both vertically and horizontally to alter the degree of vibration imparted to the shaft, and hence to the plate 5 when the shaft is rotated about its axis. To vibrate the plate 5, the shaft 15 and weights 19 are rotated about a vertical axis by means of a standard, variable speed electric motor 21 which is supported on the support frame, there being a special coupling or drive mechanism 23 to reduce, if not eradicate, the transmission of vibrations, oscillations, up and down and side to side movements of the shaft 15 to the output shaft of the motor 21.

The machine illustrated is a screening machine with only the lower screen 10 shown. It is a simple matter, however, to remove the lower screen and bolt on a vibrating chamber, a separator, a drier or a shaker or any other type of vibrating work chamber, or to adapt the plate 5 to accommodate different types of work chamber.

The drive mechanism 23 includes an input shaft 25 mounted for rotation on the frame 1 in spaced heavy duty bearings 27 and has a drive pulley 29 keyed or otherwise mounted thereon to accept drive via a belt 31 and pulley 33 from the output shaft of the motor 21. The upper end of the input shaft 25 is connected to or terminates in a plate-like member 35 and likewise the lower end of the output shaft 15 terminates in a similar plate-like member 37. A flexible resiliently deformable member 39, for example of tough rubbery material and generally in the form of a bellows, extends between the members 35 and 37, the two ends of the member 39 being clamped or otherwise connected, respectively, to the plates 35 and 37. The member 39 is so constructed that it can impart rotation of the shaft 25 to the shaft 15 and transmit high torque, and yet it will absorb all other relative movement between the two shafts, thereby preventing or minimising vibrations and oscillations in the shaft 15 from reaching the shaft 25. This of course means that when the shaft 25 is rotated, the shaft 15 will be rotated at the same speed, but because of the out-of-balance weights 17, 19 very considerable vibration will be imparted to the shaft 15 and this will be transmitted through the bearings 14 and the plates 13 and cylindrical portion 12 to the plate 5, whereas such vibration will not be imparted to the shaft 25.

As can be seen from the drawing, the memmber 39 is basically of the same construction as the bags 3 although perhaps of different dimensions. It is appreciated, however, that other constructions could be used. Also, the air bags 3 could be replaced by springs.

Although the above description has been with specific reference to the drive for any vibrating machine, it will be appreciated that an identical drive arrangement 23 together with the output shaft 15 and associated plates, out-of-balance weights, etc., could be used to vibrate a screening or separating machine such as that the subject of our application No. 1,401,631, or for that matter any other type of polishing or screening machine or other vibratory machine, such as a polishing machine, drier or shaker.

To use the machine for separating, screens must be fixed to the plate 5 in known manner. A lower screen 10 is shown bolted to the plate 5, and upper screens (not shown) can be clamped in position in known manner.

When a grinding chamber is supported on the plate 5, a media of solid chips specifically designed for the product to be ground or polished is used within the chamber. Chips are available of numerous different material depending on their requirements, and with this invention, as vibrations are set up in the grinding chamber, so the articles to be ground are vibrated and travel in a clockwise and/or anti-clockwise manner around the grinding chamber. Also, various vortex patterns are set up when the annular chamber is viewed in cross-section, imparting to the articles a continual steady stirring motion and hence grinding action. The movement imparted to the media and products can be changed by altering the speed of rotation of the shaft 15 and/or by altering both the horizontal and vertical position of weights 17 and 19 on the shaft 15 (and also their magnitude) and also by altering the support characteristics of the inflatable bags 3. For this purpose each bag 3 is provided with an individual inflation valve (not illustrated).

Discharge of polished articles from the chamber 5 may be in any desired manner, and the details form no part of the present invention.

By incorporating a drive arrangement such as that disclosed herein, we have found that virtually no vibration is imparted to the shaft 25 with the result that a belt drive 31 for this shaft can be used. It is envisaged, however, that other types of drive between the motor 21 and shaft 25 would be possible, such as a chain drive, or even a direct drive. This means that standard power sources such as "off-the-shelf" electric motors can be used to power the vibratory machine instead of using specially designed motors or special anti-vibration couplings, and special mounts for the motor, with the obvious resultant advantages.

With a drive mechanism such as that described herein, it is very simple to change the rotational speed of the output shaft 25. This is important for the grinding or polishing of delicate parts such as the polishing of needles after heat treatment, and in the case where the machine is used for screening of ceramic casting slip where varying viscosities of the materials require higher frequency of amplitude. There are many industries both in the field of screening and separation and of polishing and deburring where variable motor speed is important to provide the opportunity of flexibility of the machine so that it can carry out a range of various processes all requiring different speeds of rotation to give different frequency vibrations and various amplitudes of the separating chamber, i.e. various ranges of vertical and horizontal movement, in order successfully to process various products. For example, in laboratory or testing work it would be essential to have a variable speed motor or drive unit for the machine.

It will be appreciated that the machine is particularly suitable where special or dangerous work has to be carried out. This is because it is possible quickly to change the machine from one use to another merely by changing the work chamber and it is also possible easily to change the drive unit at short notice. For example, a standard electric motor such as that illustrated in the drawing can easily be replaced by a flame-proofed motor or an air motor or a hydraulic motor to meet the required operating conditions.

What is claimed is:

1. A vibratory machine comprising a support frame, at least one flexible suspension device supported on said support frame, a vibratable member supported by said at least one suspension device, an output shaft for vibrating said vibratable member, at least one bearing means connecting said output shaft to said vibratable member and at least one out-of-balance weight carried by said output shaft and rotatable thereby about the longitudinal axis of said output shaft, an input shaft, at least one bearing rotatably mounting said input shaft on the support frame, drive means coupled to said input shaft for rotating said input shaft, and a flexible resiliently deformable member said deformable member having a second end connected to said output shaft, said flexible resiliently deformable member defining coupling means for rotationally coupling said input shaft to said output shaft without transmitting other movements of said output shaft to said input shaft, there being two of said out-of-balance weights adjustably mounted on said output shaft one adjacent each end of the shaft, said bearings mounting said input shaft in line with said output shaft, and said drive means including a belt pulley mounted on said input shaft and a drive belt connecting said belt pulley to a power source which comprises a motor mounted on the machine frame, said bearings mounting said input and output shafts for rotation about a common vertical axis, two transverse plates connected to said vibratable member, and there being two of said bearing means, said two bearing means being vertically spaced heavy duty bearings connecting said output shaft to said transverse plates.

2. A vibratory machine as claimed in claim 1 wherein a plate-like member is connected to each of adjacent ones of said input and output shafts ends and defining means connecting said flexible resiliently deformable transmission member to said two plate-like members in sandwiched relation therebetween.

3. A vibratory machine as claimed in claim 2 wherein the flexible resiliently deformable member extending between the two plate-like members comprises an inflatable air bag in the form of a bellows.

4. A vibratory machine as claimed in claim 1 wherein there are two of said out-of-balance weights connected to said output shaft, one above an upper one of said heavy duty bearings and the other below a lower one of said heavy duty bearings, said weights being adjacent the respective ends of said output shaft.

5. A vibratory machine comprising a support frame, a vibratable member overlying said support frame, flexible resilient support elements mounting said vibratable member on said support frame for varied combinations of horizontal and vertical movements, vibrations producing means coupled to said vibratable member and including a generally vertical output shaft mounted for rotary movement relative to said vibratable member and for other movements therewith, an input shaft bearing means mounting said input shaft for rotation on said support frame in line with said output shaft and in axial spaced relation, drive means coupled to said input shaft, and a flexible resilient coupling member coupling said output shaft to said input shaft for rotation therewith and for movement relative to said input shaft in accordance with movement of said rotatable member.

6. A vibratory machine in accordance with claim 5 wherein said flexible resilient support elements and said flexible resilient coupling members are of similar construction.

7. A vibratory machine in accordance with claim 5 wherein said flexible resilient coupling member is in the form of an air bag.

8. A vibratory machine in accordance with claim 5 wherein said flexible resilient coupling member is in the form of an air bag formed of tough rubbery material in the form of bellows.

9. A vibratory machine in accordance with claim 5 wherein said coupling member is disposed vertically below the positions of said support elements.

* * * * *